United States Patent [19]

Karwowski et al.

[11] Patent Number: 4,741,910

[45] Date of Patent: May 3, 1988

[54] METHOD FOR MAKING AGGLOMERATED BITS CONTAINING ASPARTAME

[75] Inventors: Jan Karwowski, Franklin Lakes; Anna M. Magliacano, East Orange, both of N.J.

[73] Assignee: Nabisco Brands, Inc., Parsippany, N.J.

[21] Appl. No.: 836,750

[22] Filed: Mar. 6, 1986

Related U.S. Application Data

[63] Continuation-in-part of Ser. No. 681,959, Dec. 14, 1984, Pat. No. 4,585,657.

[51] Int. Cl.$^4$ .............................................. A23L 1/236
[52] U.S. Cl. .................... 426/285; 426/548; 426/453
[58] Field of Search .............. 426/285, 103, 453, 650, 426/658, 661, 548, 590

[56] References Cited

U.S. PATENT DOCUMENTS

| | | | |
|---|---|---|---|
| 3,753,739 | 8/1973 | Cella et al. | 426/548 |
| 4,051,268 | 9/1977 | Shires et al. | 426/548 |
| 4,497,835 | 2/1985 | Winston | 426/548 |
| 4,554,167 | 11/1985 | Sorge et al. | 426/548 |
| 4,619,833 | 10/1986 | Anderson | 426/590 |
| 4,704,288 | 11/1987 | Tsau | 426/548 |

Primary Examiner—Raymond N. Jones
Assistant Examiner—Carolyn Paden
Attorney, Agent, or Firm—Richard Kornutik

[57] ABSTRACT

This invention is a method for making agglomerated bits. The agglomerated bits are made by mixing aspartame and a bulking agent, desirably maltodextrin, with starch and a gum. Flavorings and dispersing agents can be added to this blend. Upon mixing of this blend, a vegetable oil and water mixture is added to the dry ingredients with mixing which causes agglomeration to occur. Following agglomeration, the agglomerated bits are dried and sifted through a screen. The agglomerated bits are suitable for use in home-cooked grain cereals and other foods.

9 Claims, No Drawings

METHOD FOR MAKING AGGLOMERATED BITS CONTAINING ASPARTAME

This invention is a continuation-in-part of U.S. patent application Ser. No. 681,959 filed Dec. 14, 1984, now U.S. Pat. No. 4,585,657.

BACKGROUND OF THE INVENTION

1. Field Of The Invention

This invention relates generally to a method for making flavoring additives for grain cereal products. More specfically, this invention relates to a method for making flavoring additives that are formed into distinct particles or bits containing an artificial sweetener, aspartame, for use in complete instant home-cooked hot cereal mixes.

2. Description Of The Prior Art

Home-cooked grain products, such as warm breakfast cereals, have traditionally been flavored at home by the preparer of the meal with the use of common sweeteners, condiments, and flavorings. For example, the flavor of oatmeal, cream of rice products, and cream of wheat is most frequently enhanced by the addition of sugar and flavorings including cinnamon, fruit particles, or other additives and sweeteners, either during or just after the cooking of the cereal. In recent times, consumers have found ready-mixed, easily prepared breakfast cereals desirable. The convenience of a ready-mixed breakfast cereal is enhanced by having all the ingredients necessary to prepare the cereal, including the sweeteners and flavorings, mixed together within the packet or box supplied by the manufacturer.

Manufacturers have provided flavorings for dry ready-to-eat cereals for years. These cereals are not cooked by the consumer. The cereals come prepared with sweeteners and flavorings ready-mixed into the product or applied to the surface of the cereal product. Those cereals, which have the flavorings ready-mixed in them, are generally flaked products in which sugar and other ingredients are incorporated into the dough mixture prior to the puffing or flaking of the final product. The resulting dough mass has the flavoring ingredients within its matrix upon puffing or baking. Products in which the flavorings are applied to the cereal surfaces are generally products upon which sugar and other flavorings have been sprayed after the cereal particles have been puffed or flaked. Generally, topical applications of sweeteners result in a glaze or frosting on the individual cereal particles.

A method, which has proven unsatisfactory in the past for flavoring either a hot or a cold cereal, is one in which the flavoring is added to the contents of the cereal as a separate and distinct particle. The mixing of a granulated flavoring into a package containing a cereal does not provide the consumer with a properly flavored product. Vibrations that occur during shipping and handling of the product cause segregation or layering to occur between the particle sizes of the cereal and the flavoring particles. When segregation occurs the cereal particles poured by the consumer from the top of the package are separated from the flavoring particles which migrate and settle at the bottom of the package.

Equally undesirable is the addition of a separate packet containing the flavorings into a larger package containing the cereal. Manufacturing problems are increased with separate packaging because additional apparatuses are required to pour the flavorings into a packet and then place that packet into the larger cereal package. Consumer acceptance is also poor with packaging of this kind. Separate packaging of the flavoring ingredients and cereal still requires the consumer to measure the desired amount of flavoring ingredient prior to adding the flavoring ingredient to the cereal during cooking.

Other difficulties also prevent the mixing of flavoring particles into home prepared hot cereals. For example, the flavoring particles must be compatible with the cereal particle during both storage and cooking. During cooking, the flavoring particles must melt at the cooking temperatures of the cereal product. The mixing of the flavoring ingredients into the cereal must not adversely effect the texture of the final cooked cereal product. These ingredients must mix rapidly with the cooked cereal particles. Another difficulty is flavor loss which can occur through volatilization of the essential flavorings during storage of the product. Usually, flavor loss is prevented or reduced by the use of more expensive, airtight packaging. Also, when the flavoring particles tend to accumulate at the bottom of the package, excess moisture from the atmosphere can cause the flavoring particles to lump into a solid mass.

U.S. Pat. No. 3,544,332 to Leebens discloses a method for adding flavoring ingredients to cereal particles. In this method, a dry ready-to-eat cereal is obtained having powdered additives incorporated into the cereal flakes. The cereal dough is puffed or extruded into pieces at a specified moisture content. These pieces are then coated with a powdered additive such as sugar or dehydrated fruit. The powdered additive covers the surface and voids of the puffed pieces. The powder covered puffed pieces are then flaked. This method entraps the additive at or near the surface of the flakes. In this patent the resulting cereal product is not intended to be cooked. The methods disclosed in this patent are not suitable for incorporating flavorings into cereals intended for home cooking. Home-cooked cereals cannot be made from puffed or extruded pieces because the integrity of the flakes is completely lost upon cooking. Such flakes break down or lose their particle integrity from the heat and mixing action that occurs during cooking of the cereal.

U.S. Pat. No. 3,840,685 to Lyall et al. discloses a method for applying sugar-sweetened coating to cereal particles. The coating is an aqueous solution containing edible fats or oils, an emulsifier, and sugar. These ingredients form a syrup having a specifically identified water content. The edible fat or oil containing the emulsifier is added to the aqueous sugar syrup at a temperature between 115° F. and 155° F. The aqueous syrup is mixed and heated to a temperature of 180° F. The aqueous syrup is applied to the cereal particles as a coating and then dried. This method eliminates the steps of separately applying oil and then sugar to the cereal particles. This method is not readily adaptable to home-prepared, hot cereals, because the cereal particles of this patent are larger than those normally found in home-prepared, hot cereals. The use of this method to flavor the thin, lightweight flakes of a home cooked, hot cereal causes clumping of the flakes and disrupts the particle integrity of the flakes.

U.S. Pat. Nos. 3,941,893 and 3,950,551 both to Glabe et al. disclose methods for producing a composite sugar syrup agglomeration and the products of those methods. These two processes involve the formation of dried flakes or ground flakes obtained from drying a thin flim of aqueous syrups of numerous sugars or sugar containing products. The flakes in the Glabe '893 patent are formed in the presence of ungelatinized starch which is partially gelatinized in situ and/or in the presence of a soy protein. The flakes are agglomerated by adding a spray of water in small amounts to the flakes while tumbling the flakes to form agglomerates. Drying occurs with continued tumbling until the agglomerates are no longer sticky. Further drying is completed on a tray or conveyor. The Glabe '551 patent, instead of forming agglomerates, produces an extrudable mixture. The agglomerates resulting from these methods are for consumption on ice cream or for use in baking, but not for use in cooked grain cereals. The agglomerates of these methods are primarily concerned with delivering a particulate sweetening ingredient. This particulate sweetening ingredient retains structural integrity upon contact with a food having a moisture content higher than that of the particulate sweetening ingredient.

U.S. Pat. No. 4,016,790 to Cole discloses a method for producing an agglomeration of cereal particles, which are double coated with fat and then coated with a dilute syrup. The resulting product is a granola-type mix. The method used to derive the product of this disclosure is primarily concerned with the mechanical operation of producing a cereal admixture. The final product is a combination of cereal, sweeteners, and flavorings, but is not intended to be used as a cooked cereal.

Aspartame is the high potency dipeptide sweetener, L-aspartyl-L-phenylalanine methyl ester. This L-aspartic acid sweetening derivative has about one hundred, fifty times the sweetness of an equal weight of sucrose. Aspartame is relatively water insoluble. Aspartame's combination of water insolubility and intense sweetness causes "hot spotting" when aspartame solutions are applied to cereal surfaces. Hot spotting is the non-uniform sweetening response that causes a burning sensation in the mouth. Hot spotting results from the uneven application of aspartame to a food particle. Aspartame is not generally added to cereal ingredients that are cooked to form cereal pieces because aspartame is thermally unstable and looses its sweetness upon thermal decomposition.

U.S. Pat. No. 3,794,741 to Weigle discloses a method for making flavor bits for incorporation into culinary mixes. The flavor bits of this patent are identified as being able to carry almost any flavoring material. The sweeteners identified for use with these flavor bits do not include aspartame. The ingredients used to make the flavor can include dextrose.

U.S. Pat. No. 4,156,020 to Bohrmann et al. discloses a method for producing a dry product for food preparations. The method of this patent forms agglomerates made from a starch-containing material. The agglomerates of this patent are identified as being suitable to flavor instant food products which can be prepared by stirring in hot or cold water. Specific foods to be flavored include soups and beverages. Also, various dextrose or dextrant products are identified as being suitable for use in these agglomerates. Various gums including a guar meal are identified as suitable for use in forming the agglomerates. The agglomerates of this patent are not used with aspartame.

U.S. Pat. No. 3,955,000 to Baggerly discloses a method for making a cereal and the product of the method. The cereal of this patent uses an L-aspartic acid derivative and sweetening compounds admixed in aqueous suspension with hydrolyzed amylaceous derivatives comprising predominantly oligosaccharide solids having a low dextrose equivalency. This composition is applied as a coating solution to a cereal based comestible. The product of this patent is a coating material containing aspartame and not a flavored agglomerate intended for a cooked cereal.

U.S. Pat. No. 4,378,377 to Gajewski discloses a method for preparing a cereal presweetened with aspartame. The cereal of this patent is a ready-to-eat cereal having an exterior coating sweetened with aspartame. The sweetened, dry comestible of this invention includes a water soluble vegetable protein isolate and aspartame. The material of this invention can be applied to corn flakes as well as to numerous other grain products. The product of this patent is not an agglomerate suitable for use with a cooked cereal.

U.S. Pat. No. 4,079,151 to Schade et al. discloses a method for making a frosted coating for sweetened foods. This patent is for a comestible coating composition utilizing aspartame and a method for applying that composition. The coating is applied to the surface of a cereal or similar food. The sweetener is applied to the cereal and dried so as to give the appearance of a frosting. This patent discloses the use of aspartame with maltodextrins. This patent does not disclose a process for making flavored agglomerates with aspartame.

The industry lacks a consumer-cooked cereal that is flavored and sweetened by agglomerated flavor bits having an artificial sweetener. The industry also lacks a complete over-the-counter package of cereal in which cereal particles and artificially sweetened flavoring particles remain evenly dispersed within the package after shipping and storage.

SUMMARY OF THE INVENTION

This invention includes a method for making agglomerated flavor bits. The method includes preblending aspartame and a bulking agent to form an aspartame premix. The aspartame premix is then mixed with other dry ingredients to form a dry mix. Liquid ingredients are blended into the dry mix in a quantity sufficient to form agglomerated bits during blending. The agglomerated bits are then dried. The invention includes the product of this method.

In the preferred embodiment maltodextrin is the bulking agent. Dry ingredients can include flavoring ingredients, starches, binders, dispersing agents, and vitamins. Liquid ingredients can include vegetable oil and water. The agglomerated bits of this invention can be screened through a sieve of a desired mesh size. Those particles that are too large to pass through a sieve can be ground to a smaller particle size.

DETAILED DESCRIPTION OF THE INVENTION

This invention includes a method for making agglomerated flavor bits. In this process aspartame and a bulking agent such as maltodextrin are preblended. Dry ingredients such as flavoring ingredients, starches, binders, dispersing agents, and vitamins are added to this preblended mixture. Liquid ingredients such as vegetable oil and water are blended with the dry mix in a quantity sufficient to form agglomerated bits during blending. The agglomerated bits are then dried. The dried agglomerated bits can then be ground to a desired particle size. The invention also includes the product of the method.

Aspartame is the preferred artificial sweetener of this invention. Additional artificial sweeteners can be used in the practice of this invention. Artificial sweeteners can also be used in combination with natural sweeteners to form agglomerated bits.

In the present invention aspartame is preblended with a bulking agent to form an aspartame premix. The use of a bulking agent with aspartame is necessary in this invention because of the concentrated sweetness per unit of volume of aspartame. The uniform distribution of aspartame throughout the bulking agent of the agglomerated bits dilutes the sweetness of aspartame and avoids the formation of "hot spots". The concentration of aspartame in the aspartame premix is between about 1 percent and about 3 percent.

The preferred bulking agent used with this invention is maltodextrin which is a water soluble carbohydrate. Maltodextrin aids in the dispersion of aspartame throughout the ingredients that form the agglomerated bits. Maltodextrin also assists in the formation of the agglomerated bits. Maltodextrin is available commercially as Maltrin 100 ® from the Grain Processing Corporation, Muscatine, Iowa 52761 or Lodex ® from the American Maize-Products Company, Corn Processing Division, 1100 Indianapolis Boulevard, Hammond, Ind. 46320. Other bulking agents that are compatible with aspartame such as polydextrose function well with this invention.

The use of maltodextrin as a bulking agent for the aspartame premix is desirable in this invention because maltodextrin adds no taste of its own to the agglomerated bits. Maltodextrin blends the sweetness and flavors of the various ingredients in the agglomerated bits and masks any aftertaste left by sweetening or flavoring ingredients. Maltodextrin has a high solubility in water and is compatible with the taste of aspartame. Maltodextrin assists in the dispersion of aspartame into a food product when the agglomerated bits are dissolved in hot water.

Malic acid is desirably added to the aspartame premix in a concentration of less than 1 percent. Malic acid enhances the sweetness of the premix and masks the aftertaste of sweetner and flavoring ingredients used in the agglomerated bits. Agglomerated bits according to this invention can be made without malic acid, but the use of malic acid permits a reduction in the amount of aspartame required to provide adequate sweetness to the agglomerated bits. The use of malic acid allows a 10 to 15 percent reduction in the amount of aspartame used in the premix and provides the resulting agglomerated bits with a more desirable or "balanced" flavor.

The preblended aspartame premix is then mixed with a variety of other dry ingredients to form a dry mix. Dry ingredients can include flavoring ingredients, starches, binders, dispersing agents, and vitamins. Conventional mixers dry ingredients can be used to mix the dry ingredients of this invention.

The flavoring ingredients contemplated by this invention include cinnamon, nutmeg, vanilla, caramel, and others. Alternative embodiments can include other natural or artifical flavors, small or ground dried fruit pieces, or dried fruit juices. Combinations of these flavorings can also provide a suitable product.

Starch is added to the aspartame premix and flavoring mixture. A desirable starch is a modified wheat starch. Other starches can be used such as tapioca, corn, wheat, and potato starches. Starch products can be in powder or flaked form. Starch serves as a binder for the particles during agglomeration and also serves to thicken the final cooked cereal.

It is desirable to add a binder to the starch containing blend of ingredients. In the preferred embodiment guar gum is used. Guar gum serves in the agglomerate mixture as both a binder and a thickener. Other binders and gums such as carboxymethyl cellulose, locust beam gum or alginates can be used. Gums or binders contribute to the texture of the finished agglomerated product. Desirable gums produce a high viscosity when added to liquid ingredients. Typically, a one percent solution of a selected binder or gum has a viscosity above 3200 centipoises. Corn syrup solids can also be used as binders. Desirable corn syrup solids suitable for use as binders have a dextrose equivalent of 30 or higher. Cereal flakes such as oats, corn, or wheat can also be included with gums or binders to add bulk and bind the agglomerated bits.

The optional addition of baking soda to the agglomerate ingredients decreases the density of the texture of the agglomerated bits. This property helps to dissolve the agglomerated bits more quickly during preparation of the instant cooked cereal. Baking soda helps to control the internal structure of the agglomerate particles. Baking soda facilitates the "break up" or dissolution of the agglomerates upon contact with hot water. Baking soda in concentrations sufficient to provide this property to the agglomerates has no adverse effect on taste. Desirable concentrations of baking soda in the agglomerated bits are between about 0.2 and 1.0 percent by weight. Concentrations of baking soda above 1.0 percent by weight impart a "salty" and/or alkaline taste to the agglomerated bits.

Liquid ingredients are blended into the dry mix in a quantity sufficient to form agglomerated bits. The ratio of liquid ingredients to dry ingredients must be favorable to the formation of moistened clumps of the ingredients. This ratio of liquid ingredients to dry ingredients must also be such that a solution of the dry ingredients is not formed.

Liquid ingredients include vegetable oil and water. These ingredients can be blended by a conventional means for mixing and preferably a wire whip mixer. Ribbon blenders and paddle mixers are also acceptable. Proper mixing of the ingredients is a function of the speed of the mixer, which is usually defined by the revolutions per minute of the wire or blade and time allowed for mixing. In the preferred embodiment of this invention the mixture is blended at about 200 revolutions per minute, which is considered a "medium speed", for about 2 to about 5 minutes. Mixing at too high of a speed or for too long a period of time results in large lumps of ingredient particles. The large lumps are formed because the individual ingredient particles become very fine and coalesce.

In the preferred embodiment a food grade vegetable oil is used in the liquid ingredients to form agglomerates. Examples of such oils include a member selected from the group consisting of corn oil, soy oil, cotton seed oil and mixtures of these. The oil is used to wet the dry ingredients and facilitate their dissolution. Too much oil prevents proper agglomeration of the blend of ingredients. Excess oil coats the dry ingredients and does not allow the dry ingredients to absorb water. The concentration of oil used in this invention is desirably between about 2 and about 6 percent with the most desirable concentration for producing agglomerates being about 4 percent.

Water is added in combination with the oil to the dry ingredients. In the preferred embodiment of this invention the water is first blended with the oil at a temperature of about 125° F. The resulting liquid solution or emulsion is generally two parts water to one part oil. Liquid ingredients in the ratio of about one part water to one part oil to about three parts water to one part oil are suitable for use with this invention. When the concentration of oil in the liquid ingredients exceeds the concentration of water, the resulting agglomerated bits develop an oily appearance and flavor after extended storage. Emulsifiers can be used to blend the water and oil ingredients together.

The addition of the liquid ingredients to the dry ingredients initiates agglomeration. Agglomeration is witnessed at a moisture content of between about 12 percent and about 20 percent by weight with the most desirable concentration being about 17 percent liquid ingredients by weight. At this moisture content agglomerates or granules are formed by the absorption of the water into the blend of starch, gum, and aspartame premix. The quantity of water used must be sufficient to produce the granules of the dry ingredients by causing the blended dry ingredients to become moist and "crumbly". An excessive amount of water can cause the blend to be too wet and tacky thereby inhibiting agglomeration. An insufficient amount of water also inhibits agglomeration. Too small a quantity of water produces a dry, powdery blend. The addition of the proper amount of water to the blend of dry ingredients results in agglomeation because the water causes the blend of artificial sweetener, bulking agent, and starch to become sticky and cemented together in larger particles.

The agglomerated bits can be dried in any forced air convection over or other suitable drying equipment. It is preferable to use a continuous flow, vertical dryer. In the preferred embodiment of the process of this invention a forced air Wyssmont Turbine dryer is used. The scrapers of this turbine dryer keep the agglomerates suspended and moving in hot air as they dry. Circulating air in the dryer in this manner prevents agglomerates from adhering to one another. This produces distinct agglomerates. When the agglomerated bits are dried they drop through holes in shelves placed through this turbine dryer.

The oven or dryer used in this invention is at a temperature of between about 130° F. and about 170° F. The agglomerates are dried in the oven for between about 20 minutes and about 40 minutes in the presence of forced air. Higher temperatures or different sized ovens can affect the amount of time required to dry the agglomerates and the hardness of the dried agglomerates. Drying is complete when a moisture content of between about 4 percent and about 7 percent by weight is present within the agglomerated bits. A moisture content of approximately 5 percent is preferred. Care must be taken during the drying process to avoid excessive temperatures that cause decomposition or "baking" of the agglomerates.

The dried agglomerates are then screened to obtain a desired particle size. A #7 U.S. mesh screen is used in the preferred embodiment of the invention. Particles too large to pass a #7 U.S. mesh can be recycled and ground to a smaller size. This procedure can be followed using a standard means for grinding such as a Fitzmil. Small particles having a distinct granular appearance are preferred. Screens having sizes between about a number 6 and about a number 8 U.S. mesh can be used in this invention.

The particle size and density of the agglomerated bits can vary inversely to one another. This variance of particle size and density must be such that the resulting agglomerated bits are (1) compatible with the particle size of their intended food product or cereal so as to avoid particle segregation in storage or shipment and (2) dissolved quickly or within one minute upon contact with hot water of a temperature at least about 150° F.

In any agglomerating or grinding process a production of a small amount of "dust" or fines occurs. An excessive amount of fines is undesirable and results in a product that is not acceptable to the consumer. The presence of the proper amount of water in the blend prior to agglomeration generally prevents excessive dust formation. An insufficient water concentration in preparing the agglomerated bits results in an abundance of fines in the final product. The use of binders is desirable in eliminating "dust" formation.

The agglomerated bits can be mixed directly with the flakes of a home cooked grain cereal. Upon cooking the mixture of cereal and agglomerated bits by adding hot water, the agglomerated bits according to this invention dissolve with only gentle stirring. Typically, the bits dissolve at temperatures between about 150° F. and about 212° F. after approximately 1 minute. Undesirably large particles do not always dissolve in this amount of time at this temperature range without mixing by the preparer. For this reason the screening process in the preferred embodiment is desirable.

Agglomerated bits according to this invention are suitable for packaging with the cereal grains or flakes of an instant home-cooked cereal. The agglomerated bits are useful to thicken these cereal products. The thickening properties of the agglomerated bits are largely the result of the starch and gum ingredients of the agglomerated bits being dispersed into the cereal. Agglomerated bits according to this invention remain evenly distributed throughout a dry, packaged cereal product in part because their size and density are similar to the particle size and density of the cereal product.

The following examples further illustrate the invention, but are not intended to limit the scope of the invention.

EXAMPLE I

The following example is a method for making aspartame-sweetened cinnamon and apple flavored agglomerated bits. This example is the preferred embodiment of the invention. The ingredients and their concentrations are presented in Table I.

TABLE I

|  | GRAMS |
|---|---|
| ASPARTAME PREMIX | |
| Maltrin 100 ® | 195.0 |
| Malic Acid | 0.5 |
| Aspartame | 4.5 |
|  | 200.00 |
| DRY INGREDIENTS | |
| Aspartame Premix | 200.0 |
| Modified Wheat Starch | 62.5 |
| Guar Gum | 28.0 |
| Salt | 28.0 |
| Vitamin and Mineral Premix | 1.0 |
| Calcium Carbonate | 9.0 |
| Artificial Apple Flavor | 1.0 |
| Cinnamon | 14.0 |
| Corn Cereal | 135.5 |

TABLE I-continued

|  | GRAMS |
|---|---|
| Caramel Color | 3.0 |
| Vanilla | 17.0 |
| Sodium Bicarbonate | 1.0 |
|  | 500.00 |
| LIQUID INGREDIENTS |  |
| Vegetable Oil | 35.0 |
| Water | 65.0 |
|  | 100.0 |

The aspartame, Maltrin 100® and malic acid are preblended at low speed or about 80 revolutions per minute in a wire whip mixer for 2 minutes. The vanilla, is added to the aspartame premix with continued mixing for 1 minute. Then the drying ingredients including the wheat starch, guar gum, and corn cereal are added with the sodium bicarbonate and calcium carbonate. These ingredients are mixed for another 2 minutes. To this mixture a blend of vegetable oil and water is added at 125° F. with mixing at low speed to prevent lumping. After the liquid ingredients are added, the mixer is increased to medium speed or about 200 revolutions per minute. This mixing results in the formation of agglomerated bits in about 4 minutes.

The agglomerated bits are passed through a number 7 U.S. mesh screen. The agglomerated bits are then dried in a Wyssmont turbine forced air dryer at a temperature of 150° F. for 30 minutes. After drying, the agglomerated bits are again passed through a number 7 U.S. mesh screen. The agglomerated bits which are too large to pass through the screen are ground and recycled for further screening.

The agglomerated bits of this example have a sweet cinnamon taste and contain uniformly distributed aspartame. The agglomerates are suitable for addition to cereal grains such as farina, instant oats, wheat flakes, rice, or barley.

EXAMPLE II

This example illustrates a method for making agglomerated bits that sweeten a cereal without adding a flavor. The ingredients and their concentrations are presented in Table II.

TABLE II

|  | GRAMS |
|---|---|
| ASPARTAME PREMIX |  |
| Maltrin 100 ® | 195.0 |
| Malic Acid | 0.5 |
| Aspartame | 4.5 |
|  | 200.00 |
| DRY INGREDIENTS |  |
| Aspartame Premix | 200.00 |
| Modified Wheat Starch | 90.0 |
| Guar Gum | 28.0 |
| Salt | 28.0 |
| Vitamin Premix | 1.0 |
| Calcium Carbonate | 9.0 |
| Processed Corn Cereal | 140.0 |
| Caramel Color | 3.0 |
| Sodium Bicarbonate | 1.0 |
|  | 500.00 |
| LIQUID INGREDIENTS |  |
| Vegetable Oil | 35.0 |
| Water | 70.0 |
|  | 105.0 |

The same procedure as used in Example I is followed with this example except that the flavorings are omitted. Agglomerated bits having a sweet taste result from this example. The agglomerated bits contain uniformly distributed aspartame.

EXAMPLE III

This example illustrates a method for making agglomerated bits that do not contain malic acid. The ingredients and their concentrations are presented in Table III.

TABLE III

|  | GRAMS |
|---|---|
| ASPARTAME PREMIX |  |
| Maltrin 100 ® | 195.0 |
| Aspartame | 5.0 |
|  | 200.00 |
| DRY INGREDIENTS |  |
| Aspartame Premix | 200.00 |
| Modified Wheat Starch | 89.0 |
| Guar Gum | 30.0 |
| Salt | 30.0 |
| Processed Corn Cereal | 150.0 |
| Sodium Bicarbonate | 1.0 |
|  | 500.0 |
| LIQUID INGREDIENTS |  |
| Vegetable Oil | 40.0 |
| Water | 60.0 |
|  | 100.0 |

The same procedure as used in Example I is followed with this example except that the flavorings and other miscellaneous ingredients are ommitted. Additional aspartame is required in this example in order to provide a concentration of sweetness equivalent to the agglomerated bits of Example I.

What is claimed is:

1. A method for making agglomerated bits comprising:
    (a) preblending aspartame and a bulking agent to form an aspartame premix;
    (b) mixing dry ingredients with said aspartame premix to form a dry mix;
    (c) blending liquid ingredients into said dry mix, said liquid ingredients being in a quantity sufficient to form agglomerated bits; and
    (d) drying said agglomerated bits.

2. A method according to claim 1, wherein said bulking agent is maltodextrin.

3. A method according to claim 2, wherein said aspartame premix has an aspartame concentration of between about 1 percent and about 3 percent.

4. A method according to claim 3, wherein said aspartame premix contains malic acid.

5. A method according to claim 2, wherein said dry ingredients comprise flavoring ingredients, starches, and binders.

6. A method according to claim 5, wherein said liquid ingredients comprise vegetable oil and water.

7. The method according to claim 6, wherein said agglomerated bits are dried at a temperature of between about 125° F. and about 175° F. for between about 20 minutes and about 40 minutes.

8. A method according to claim 7, wherein said agglomerated bits have a moisture content of between about 12 percent and about 15 percent prior to said drying and have a moisture content of between about 4 and about 7 percent subsequent to said drying.

9. A method according to claim 8, wherein said agglomerated bits are of a size capable of passing through a #7 U.S. mesh screen subsequent to said drying.

* * * * *